US010083565B2

(12) United States Patent
Schwartz

(10) Patent No.: US 10,083,565 B2
(45) Date of Patent: Sep. 25, 2018

(54) PIN ENCRYPTION TECHNIQUES

(71) Applicant: Global Payments Gaming Services Inc., Las Vegas, NV (US)

(72) Inventor: Andrew J. Schwartz, Las Vegas, NV (US)

(73) Assignee: Global Payments Gaming Services, Inc., Las Vegas, NV (US)

(*) Notice: Subject to any disclaimer, the term of this patent is extended or adjusted under 35 U.S.C. 154(b) by 0 days.

(21) Appl. No.: 15/410,834

(22) Filed: Jan. 20, 2017

(65) Prior Publication Data

US 2017/0213426 A1 Jul. 27, 2017

Related U.S. Application Data

(60) Provisional application No. 62/281,775, filed on Jan. 22, 2016.

(51) Int. Cl.
*G06F 17/00* (2006.01)
*G07F 7/10* (2006.01)
*G07F 19/00* (2006.01)

(52) U.S. Cl.
CPC ............ *G07F 7/1091* (2013.01); *G07F 19/20* (2013.01)

(58) Field of Classification Search
CPC ......... G06Q 10/087; G06K 2017/0045; G06K 19/06084; G06K 19/10; G06K 19/14
USPC .................................................. 235/375–386
See application file for complete search history.

(56) References Cited

U.S. PATENT DOCUMENTS

| | | | | |
|---|---|---|---|---|
| 9,489,664 | B2 | 11/2016 | Johnson et al. | |
| 9,525,494 | B2 | 12/2016 | Pender | |
| 2013/0024387 | A1* | 1/2013 | Dillon ................ | G06Q 10/0833 705/317 |

* cited by examiner

*Primary Examiner* — Jamara Franklin
(74) *Attorney, Agent, or Firm* — Mendelsohn Dunleavy, P.C.; Steve Mendelsohn

(57) ABSTRACT

In certain embodiments, an ATM system validates a user having a multi-digit PIN code. During different access events, either at the same ATM machine or at different ATM machines, the ATM machine presents to the user different sequences of one or more representations of the user's PIN code that identify different subsets of digits and/or different orders of digits to be provided by the user for validation. This makes it more difficult for third parties to steal a user's PIN code because no single access event involves all of the digits in the user's PIN code and/or the proper order of the digits in the user's PIN code, and different access events involve different sequences of the PIN code. In a distributed ATM system having a centralized banking subsystem, the correct PIN code is never provided to an ATM machine for any one access event, thereby further improving system security.

21 Claims, 3 Drawing Sheets

100

PIN ENCRYPTION TECHNIQUES

CROSS-REFERENCE TO RELATED APPLICATIONS

This application claims the benefit of the filing date of U.S. provisional application No. 62/281,775, filed on Jan. 22, 2016, the teachings of which are incorporated herein by reference in their entirety.

BACKGROUND

Field of the Invention

The present invention relates to computer security and, more specifically but not exclusively, to techniques using personal identification numbers (PINs) to limit access to computer-based systems, such as automated teller machine (ATM) systems and the like, to authorized individuals.

Description of the Related Art

This section introduces aspects that may help facilitate a better understanding of the invention. Accordingly, the statements of this section are to be read in this light and are not to be understood as admissions about what is prior art or what is not prior art.

As a security measure, a conventional automated teller machine requires a user to enter a four-digit PIN (personal identification number) code before withdrawing cash or conducting other banking operations. In order to inhibit third parties from illicitly acquiring user PIN codes by viewing users entering their PIN codes, conventional ATM machines do not allow users to enter their PIN codes using a touch-screen monitor. Instead, conventional ATM machines require users to enter their PIN codes on keypads which make it harder for third parties to see the digits being entered by users. Moreover, to prevent electronic eavesdropping of the PIN codes, the keypads of conventional ATM machines are configured with sophisticated encoding algorithms that encode the four-digit PIN codes into longer encoded values for transmission to the remote banking subsystem. Notwithstanding these security measures, there remains the serious risk of third parties viewing or video recording users entering their PIN codes into ATM machines.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
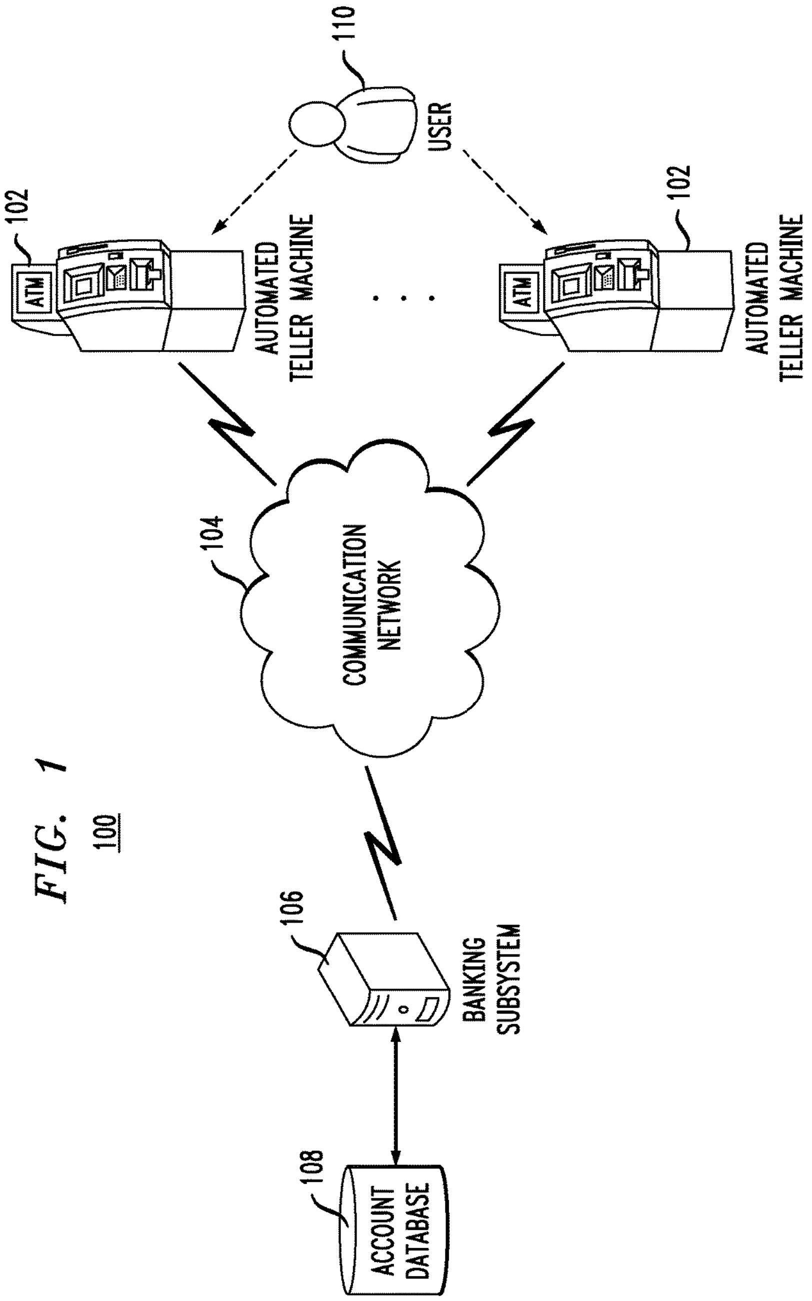
FIG. 1 is a simplified, high-level block diagram of an ATM system according to one possible embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to certain embodiments of the invention, an ATM machine requires a user to enter a subset of the digits of the user's full PIN code in order to use the ATM machine, where the particular digits vary for different access events. For example, in one possible implementation of the invention, a user's full PIN code for his bank account may be a 10-digit number, and ATM machines require the user to enter a three-digit subset of that full 10-digit PIN code before allowing the user to access his bank account. Each time that the user uses any such ATM machine, either the same ATM machine or a different ATM machine, to access his bank account (i.e., an "access event"), the ATM machine presents the user with a display that identifies which three digits of the full 10-digit PIN code to enter, where the particular three digits vary from access event to access event and where the ATM machine displays on its monitor a masked representation of the user's full PIN code that identifies the specific digits to be entered.

Assume, for example, that the user's 10-digit PIN code is 38492-35621. During a particular access event, the ATM machine may present the following representation of the user's full 10-digit PIN code to the user:

XX?X?-XXXX?

where each "?" represents the location of a PIN code digit to be provided by the user during the current access event, and each "X" represents the location of a PIN code digit that the user does not need to provide (and should not provide) during the current access event. In this case, the representation indicates that the user is required to enter the third digit, then the fifth digit, and then the tenth digit of his full 10-digit PIN code or "4, 2, 1" for the system to validate the user as being authorized to access his bank account.

During the next access event, either at the same ATM machine or a different ATM machine, the ATM machine may present the following PIN code representation to the user:

X?XX?-X?XXX

This representation indicates that the user is required to enter the second digit, then the fifth digit, and then the seventh digit of his full 10-digit PIN code or "8 2 5" in order for the ATM system to allow the user to access his bank account.

In certain implementations, the ATM system selects the subset of digits to be entered for each access event. The ATM system ensures that the subset of digits to be entered at ATM machines is different for successive access events. As such, even if a third party were watching a user enter the three digits associated with a particular access event, that third party would not be able to access the user's bank account using the same three digits during a subsequent access event at either the same ATM machine or a different ATM machine, because that next access event would involve a different three-digit subset of the user's full 10-digit PIN code.

As a result, an ATM machine could be safely configured to allow a user to enter the three-digit PIN-code subset using a touch-screen monitor. Such an ATM machine could be designed without a keypad, thereby reducing the cost of provisioning the ATM machine. It would also enable an ATM machine to be configured without requiring a sophisticated encoding algorithm to prevent electronic eavesdropping, thereby further reducing cost. In some implementations, the ATM machine could simply transmit the three-digit PIN-code subset in an unencoded manner, along with the corresponding digit locations, to an ATM system controller, which knows the user's full 10-digit PIN code.

FIG. 1 is a simplified, high-level block diagram of an ATM system 100 according to one possible embodiment of the invention. As shown in FIG. 1, the ATM system 100 has a plurality of ATM machines 102 that are configured to communicate via a suitable communication network 104 with a banking subsystem 106 that accesses a database 108 storing information about customer bank accounts. The ATM system 100 enables customers, like user 110, to operate the ATM machines 102 to access their bank accounts to perform banking functions, such as withdrawing cash.

The communication network 104 may include a local area network (LAN), a wide area network (WAN), and/or a global area network (GAN). The communication network 104 may provide for wireline, wireless, or a combination of wireline and wireless communication between devices in the network. In one embodiment, the communication network 104 includes the Internet.

Figure 2:
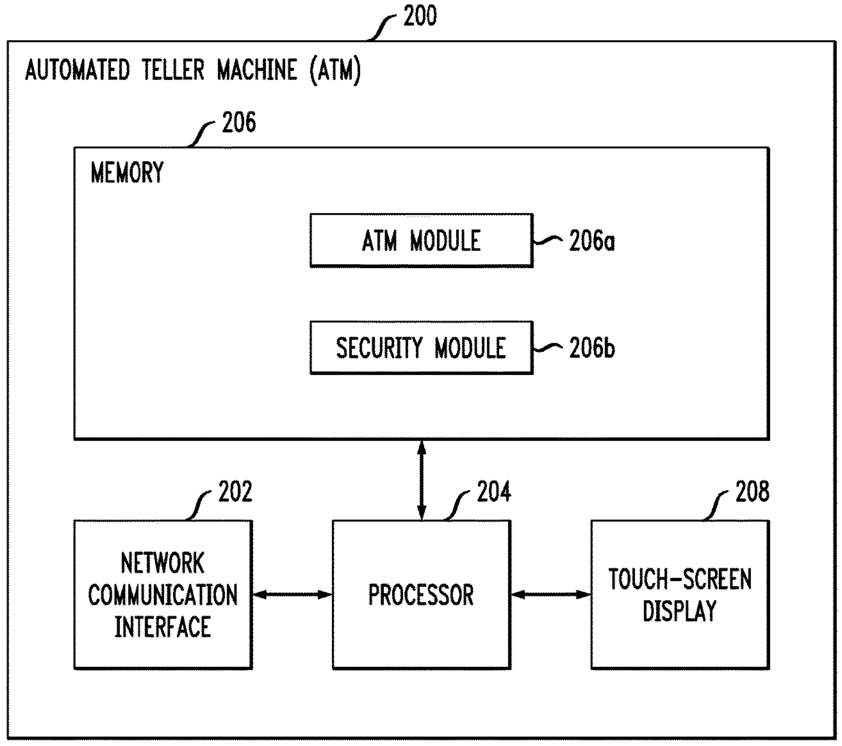
FIG. 2 is a simplified, high-level block diagram of an ATM machine that may be used to implement any of the ATM machines of FIG. 1, according to one embodiment of the invention.

FIG. 2 is a simplified, high-level block diagram of an ATM machine 200 that may be used to implement any of the ATM machines 102 of FIG. 1, according to one embodiment of the invention. As shown in FIG. 2, the ATM machine 200 includes a network communication interface 202, a processing device 204, a memory device 206, and a touch-screen display device 208. In certain embodiments, the ATM machine 200 is operated by a financial institution, such as a bank, while, in other embodiments, the ATM machine 200 is operated by an entity other than a financial institution.

The memory device 206 includes computer-executable code that instructs the processing device 204 to operate the network communication interface 202 to perform certain communication functions of the ATM machine 200. In one embodiment, the memory device 206 may include an ATM module **206*a* and a security module 206*b*. The computer-executable program code of the ATM module 206*a* and the security module 206*b* may instruct the processing device 204 to perform certain login, data-processing, and data-storage functions of the ATM machine 200, as well as communication functions of the ATM machine 200. In this regard, the processing device is typically configured to communicate with the banking subsystem 106 of FIG. 1 to validate a customer seeking to perform a financial transaction and render text on the display device 208. It should be appreciated that the display device 208 includes touch-screen functionality allowing a user to interact with the ATM machine 200**.

Figure 3:
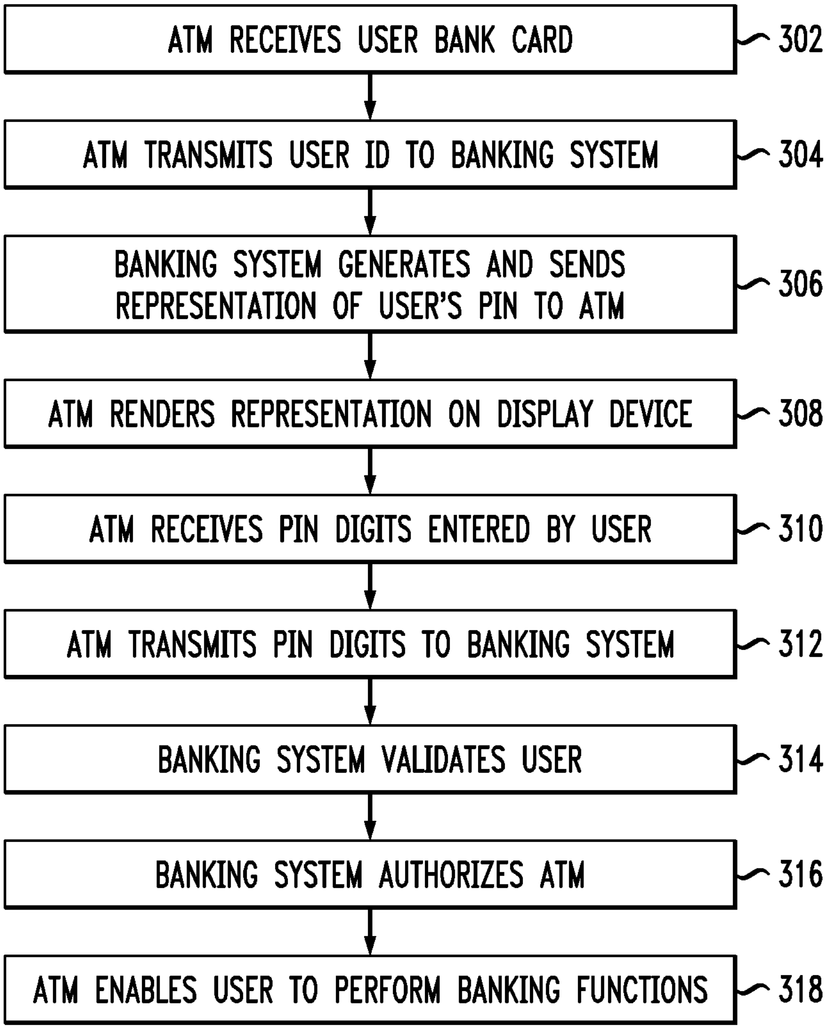
FIG. 3 is a flow diagram of processing implemented by the banking network of FIG. 1 during an access event in which the user uses one of the ATM machines, according to one possible embodiment of the invention.

FIG. 3 is a flow diagram of processing implemented by the banking system 100 of FIG. 1 during an access event in which the user 110 uses one of the ATM machines 102, according to one possible embodiment of the invention. The processing begins in step 302 with the user 110 inserting his bank card into the ATM machine 102, which reads identification information stored on the bank card that uniquely identifies the user 110. Note that the user identification information is not the same as the user's PIN code. Nor is the user's PIN code stored on the user's bank card. In step 304, the ATM machine 102 transmits the user identification information to the banking subsystem 106 via the communication network 104.

In step 306, the banking subsystem 106 uses the received user identification information retrieves the user's full PIN code from the account database 108, generates an appropriate representation of the full PIN code, which identifies a particular subset of the digits to be provided by the user 110, and transmits that PIN-code representation to the ATM machine 102 via the communication network 104. Depending on the particular implementation, the banking subsystem 106 may maintain a history of the user's previous access events in the account database 108, in which the record for each access event includes the particular digits in the corresponding PIN-code representation that the user was required to provide. When generating the PIN code for the current access event, the banking subsystem 106 ensures that the subset of digits required to be entered by the user is different from the one or more subsets of required digits for the previous one or more access events. Two subsets are said to be different if they differ in at least one digit. In this way, third parties are inhibited from determining the user's full 10-digit PIN code even when illicitly observing multiple access events.

In step 308, the ATM machine 102 renders the PIN-code representation on its display device 208. The PIN-code presentation identifies to the user the particular subset of PIN code digits to be entered for the current access event. In a preferred implementation in which the ATM machine 200 does not have a separate keypad, in step 310, the user enters the required PIN digits via the ATM's touch-screen display device 208. If the ATM machine does have a keypad, then the user can alternatively enter the required PIN digits using the keypad. In any case, in step 312, the ATM machine 102 transmits the entered digits to the banking subsystem 106 via the communication network 104.

In step 314, the banking subsystem 106 compares the values of the received digits with the corresponding values of the PIN-code subset in the current PIN-code representation of the full PIN code to validate or not validate the user. If the values of the received digits match the values of the corresponding PIN digits, then, in step 316, the user is validated, and the banking subsystem 106 sends authorization to the ATM machine 102 via the communication network 104 for the ATM machine 102 to allow the user to perform banking functions, and, in step 318, the ATM machine 102 enables the user to proceed to perform those functions. If one or more of the received digits do not match to corresponding PIN digits, then the user is not validated, the banking subsystem 106 informs the ATM machine 102 via the communication network 104 that the user is not yet validated, and the ATM machine 102 prevents the user from performing further banking functions.

Note that, during the entire access event, at no time is the user's full PIN code provided to or stored in the ATM machine 102, by either the user 110 or the banking subsystem 106.

In the implementation of FIG. 3, the banking subsystem 106 determines whether the user 110 is validated. In that case, the ATM machine 102 does not need to receive the actual values of the corresponding PIN digits from the banking subsystem 106. In an alternative implementation, the banking subsystem 106 provides both the representation of the user's PIN code to be displayed as well as the actual values corresponding to the PIN digits to be entered by the user into the ATM machine 102, and the ATM machine 102 then compares the values of the entered digits with the values of the corresponding PIN digits to determine whether or not the user 110 is validated.

Although the invention has been described in the context of ATM machines for banking networks that require the entry of three-digit subsets of 10-digit PIN codes, the invention is not so limited. In general, the invention can be implemented using a one-or-more-digit subset of a multi-digit PIN code in any suitable context that requires PIN codes, including ATM machines, kiosks in casinos and other gaming enterprises, store check-out counters, gas station gasoline pumps, airline ticket machines, etc. Note that the size of the subset (i.e., the number of digits that the user is required to provide) may also vary from access event to access event. As used herein, the term "gaming enterprise" may refer to a single gaming location, such as an individual casino, or a number of different, affiliated gaming locations, such as a plurality of casinos owned or operated by the same company.

Furthermore, the invention is not necessarily limited to PIN codes comprising a plurality of the digits (0-9). In general, the invention can be implemented using any code comprising a plurality of characters, where the characters may be any alphanumeric and/or symbolic characters, and the representation of the code presented to the user identifies the subset of the total number of characters in the code that the user is required to provide during an access event.

To the extent that the invention is not limited to banking applications, the ATM system 100 of FIG. 1 may be considered to be a distributed computer network, where each ATM machine 102 is a remote terminal or slave node of the computer network, and the banking subsystem 106 is a centralized server or master node of the computer network.

One embodiment is a system-implemented method for validating a user having a code comprising a plurality of characters. The method comprises, during a first access event, (a) the system presenting to the user a first representation of the user's code that identifies a first subset of one or more of the characters to be provided by the user; (b) the system receiving from the user a value for each character in the first subset; and (c) the system comparing the value for each character in the first subset received from the user with a value of a corresponding character in the user's code to determine whether or not the user is validated.

In a further embodiment, the system is a distributed ATM system comprising a centralized banking subsystem and at least first and second remote ATM machines configured to communicate with the centralized banking subsystem via a communication network. The user's code is a PIN code comprising a plurality of digits. The first ATM machine presents to the user the first representation of the user's PIN code, receives from the user the value for each digit in the first subset, and transmits each digit value to the centralized banking subsystem. The centralized banking subsystem compares each digit value with the value of the corresponding digit in the user's PIN code to determine whether or not the user is validated. The system enables the user to perform further system-implemented functions during the first access event if the system determines that the user is validated, and the system prevents the user from performing the further system-implemented functions during the first access event if the system determines that the user is not validated.

During a second access event different from the first access event, the second ATM machine presents to the user a second representation of the user's PIN code that identifies a second subset of one or more of the digits to be provided by the user, wherein the second subset is different from the first subset; receives from the user a value for each digit in the second subset; and transmits each digit value in the second subset to the centralized server. The centralized banking subsystem compares each digit value in the second subset with the value of the corresponding digit in the user's PIN code to determine whether or not the user is validated. The centralized banking subsystem enables the user to perform further system-implemented functions during the second access event if the centralized banking subsystem determines that the user is validated, and the centralized banking subsystem prevents the user from performing the further system-implemented functions during the second access event if the centralized banking subsystem determines that the user is not validated.

The first ATM machine is not provided with values for all of the digits in the user's PIN code during the first access event, and the second ATM machine is not provided with values for all of the digits in the user's PIN code during the second access event.

In the embodiments described previously, the ATM machine presents a single representation of the user's PIN code that indicates the subset of the PIN-code digits to be entered by the user, and the user enters those digits in the order in which the digits appear in the PIN code. For the previous example of the 10-digit PIN code of 38492-35621 and a PIN-code representation of:

XX?X?-XXXX?

the user is required to enter first the third digit, next fifth digit, and last the tenth digit of the full 10-digit PIN code or "4 2 1" for the system to validate the user.

In an alternative implementation, the ATM machine indicates a selected, specific order in which the user must enter those digits that may be (but does not have to be) different from the order in which those digits appear in the full PIN code. Instead of entering the third digit, then the fifth digit, and then the tenth digit, the ATM machine may indicate that the user must enter those same digits, but in a different, specific order. To that end, the ATM machine may present a sequence of three different PIN-code representations to the user, one for each different digit to be sequentially entered. For example, if the selected, specific order for entering the digits were the fifth digit, then the tenth digit, and then the third digit, the ATM machine could present the following PIN-code representation to prompt the user first to enter the fifth digit of "2":

XXXX?-XXXXX

The ATM machine could then present the following PIN-code representation to prompt the user next to enter the tenth digit of "1":

XXXXX-XXXX?

The ATM machine could then present the following PIN-code representation to prompt the user last to enter the third digit of "4":

XX?XX-XXXXX

Referring to FIG. 3, the sequence of steps 306-312 could be implemented three different times, once of each different digit. After the third digit is entered and transmitted, the banking system could then implement steps 314-316 to validate the user and authorize the ATM machine as before. The next time the user accesses the same or different ATM machine, not only could the subset of digits be different, but the order of entering those digits could also be different, thereby further improving the security of the user-validation process.

The technique of varying the order in which PIN-code digits are entered could be applied in a user-validation process that involves the user entering all of the PIN-code digits instead of entering only a subset of those digits. For example, in a system having four-digit PIN codes, the user-validation process could involve a selected, specific sequence for entering all four of those four digits. Here, too, the processing of FIG. 3 could involve implementing the sequence of steps 306-312 four different times with four different PIN-code representations, each indicating to the user to enter a different one of the four PIN-code digits. Such a scheme provides added security over a traditional user-validation process in which the user always enters the PIN-code digits in the same order. Someone viewing just the sequence of digits entered by the user would not know which digits belonged to which location within the user's PIN code.

In some embodiments, the invention is a system-implemented method and a corresponding system for validating a user having a code comprising a plurality of characters. During a first access event, the system presents to the user a first sequence of one or more representations of the user's code, where each representation identifies one or more characters to be provided by the user. The first sequence is characterized by at least one of (i) the characters identified by the first sequence correspond to a first subset of the characters in the code and (ii) the first sequence identifies the characters in a first order different from the order in which the characters appear in the code. The system receives from the user a value for each identified character in the first sequence, and the system compares the value for each character in the first sequence received from the user with a value of a corresponding character in the user's code to determine whether or not the user is validated.

In some embodiments, the characters identified by the first sequence correspond to the first subset of the characters in the code.

In some embodiments, the first sequence identifies the characters in the first order different from the order in which the characters appear in the code.

In some embodiments, during a second access event different from the first access event, the system presents to the user a second sequence of one or more representations of the user's code. The second sequence is characterized by at least one of (i) the characters identified by the second sequence correspond to a second subset of the characters in the code different from the first subset and (ii) the second sequence identifies the characters in a second order different from the first order. The system receives from the user a value for each identified character in the second sequence, and the system compares the value for each character in the second sequence received from the user with a value of a corresponding character in the user's code to determine whether or not the user is validated.

In some embodiments, the user's code is a personal identification number (PIN) code comprising a plurality of digits.

In some embodiments, during the first access event, the system enables the user to perform further system-implemented functions during the first access event if the system determines that the user is validated, and the system prevents the user from performing the further system-implemented functions during the first access event if the system determines that the user is not validated.

In some embodiments, the system is a distributed system comprising a centralized server and at least a first remote terminal configured to communicate with the centralized server. The first remote terminal presents to the user the first sequence of one or more representations of the user's code, the first remote terminal receives from the user the value for each identified character in the first sequence, the first remote terminal transmits each character value to the centralized server, the centralized server compares each character value with the value of the corresponding character in the user's code to determine whether or not the user is validated, and the first remote terminal is not provided with values for all of the characters in the user's code during the first access event.

In some embodiments, during a second access event different from the first access event, the first remote terminal presents to the user a second sequence of one or more representations of the user's code, wherein the second sequence is characterized by at least one of (i) the characters identified by the second sequence correspond to a second subset of the characters in the code different from the first subset and (ii) the second sequence identifies the characters in a second order different from the first order. The first remote terminal receives from the user a value for each character in the second sequence, the first remote terminal transmits each character value in the second sequence to the centralized server, the centralized server compares each character value in the second sequence with the value of the corresponding character in the user's code to determine whether or not the user is validated, and the first remote terminal is not provided with values for all of the characters in the user's code during the second access event.

In some embodiments, the distributed system further comprises a second remote terminal configured to communicate with the centralized server and different from the first remote terminal. During a second access event different from the first access event, the second remote terminal presents to the user a second sequence of one or more representations of the user's code, wherein the second sequence is characterized by at least one of (i) the characters identified by the second sequence correspond to a second subset of the characters in the code different from the first subset and (ii) the second sequence identifies the characters in a second order different from the first order. The second remote terminal receives from the user a value for each character in the second sequence, the second remote terminal transmits each character value in the second sequence to the centralized server, the centralized server compares each character value in the second sequence with the value of the corresponding character in the user's code to determine whether or not the user is validated, and the second remote terminal is not provided with values for all of the characters in the user's code during the second access event.

In some embodiments, the system is a distributed ATM system comprising a centralized banking subsystem and at least first and second remote ATM machines configured to communicate with the centralized banking subsystem via a communication network, and the user's code is a PIN code comprising a plurality of digits.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A system-implemented method for validating a user having a code comprising a plurality of characters, the method comprising, during a first access event:

(a) the system presenting to the user a first sequence of one or more representations of the user's code, wherein:

each representation identifies one or more characters to be provided by the user;

the first sequence is characterized by at least one of:

(i) the characters identified by the first sequence correspond to a first subset of the characters in the code; and (ii) the first sequence identifies the characters in a first order different from the order in which the characters appear in the code;

(b) the system receiving from the user a value for each identified character in the first sequence; and (c) the system comparing the value for each character in the first sequence received from the user with a value of a corresponding character in the user's code to determine whether or not the user is validated.

2. The method of claim 1, wherein the characters identified by the first sequence correspond to the first subset of the characters in the code.

3. The method of claim 1, wherein the first sequence identifies the characters in the first order different from the order in which the characters appear in the code.

4. The method of claim 3, wherein the characters identified by the first sequence correspond to the first subset of the characters in the code.

5. The method of claim 1, further comprising, during a second access event different from the first access event:

(d) the system presenting to the user a second sequence of one or more representations of the user's code, wherein the second sequence is characterized by at least one of:

(i) the characters identified by the second sequence correspond to a second subset of the characters in the code different from the first subset; and (ii) the second sequence identifies the characters in a second order different from the first order;

(e) the system receiving from the user a value for each identified character in the second sequence; and (f) the system comparing the value for each character in the second sequence received from the user with a value of a corresponding character in the user's code to determine whether or not the user is validated.

6. The method of claim 1, wherein the user's code is a personal identification number (PIN) code comprising a plurality of digits.

7. The method of claim 1, further comprising, during the first access event:

(d) the system enabling the user to perform further system-implemented functions during the first access event if the system determines that the user is validated in step (c); and (e) the system preventing the user from performing the further system-implemented functions during the first access event if the system determines that the user is not validated in step (c).

8. The method of claim 1, wherein:

the system is a distributed system comprising a centralized server and at least a first remote terminal configured to communicate with the centralized server;

step (a) comprises the first remote terminal presenting to the user the first sequence of one or more representations of the user's code;

step (b) comprises the first remote terminal receiving from the user the value for each identified character in the first sequence;

step (c) comprises:

(c1) the first remote terminal transmitting each character value to the centralized server;

(c2) the centralized server comparing each character value with the value of the corresponding character in the user's code to determine whether or not the user is validated; and the first remote terminal is not provided with values for all of the characters in the user's code during the first access event.

9. The method of claim 8, wherein:

the method further comprises, during a second access event different from the first access event:

(d) the first remote terminal presenting to the user a second sequence of one or more representations of the user's code, wherein the second sequence is characterized by at least one of:

(i) the characters identified by the second sequence correspond to a second subset of the characters in the code different from the first subset; and (ii) the second sequence identifies the characters in a second order different from the first order;

(e) the first remote terminal receiving from the user a value for each character in the second sequence;

(f) the first remote terminal transmitting each character value in the second sequence to the centralized server;

(g) the centralized server comparing each character value in the second sequence with the value of the corresponding character in the user's code to determine whether or not the user is validated; and the first remote terminal is not provided with values for all of the characters in the user's code during the second access event.

10. The method of claim 9, wherein:

the distributed system further comprises a second remote terminal configured to communicate with the centralized server and different from the first remote terminal;

the method further comprises, during a second access event different from the first access event:

(d) the second remote terminal presenting to the user a second sequence of one or more representations of the user's code, wherein the second sequence is characterized by at least one of:

(i) the characters identified by the second sequence correspond to a second subset of the characters in the code different from the first subset; and (ii) the second sequence identifies the characters in a second order different from the first order;

(e) the second remote terminal receiving from the user a value for each character in the second sequence;

(f) the second remote terminal transmitting each character value in the second sequence to the centralized server;

(g) the centralized server comparing each character value in the second sequence with the value of the corresponding character in the user's code to determine whether or not the user is validated; and the second remote terminal is not provided with values for all of the characters in the user's code during the second access event.

11. The method of claim 1, wherein:

the system is a distributed ATM system comprising a centralized banking subsystem and at least first and second remote ATM machines configured to communicate with the centralized banking subsystem via a communication network;

the user's code is a PIN code comprising a plurality of digits;

step (a) comprises the first ATM machine presenting to the user the first sequence of one or more representations of the user's PIN code;

step (b) comprises the first ATM machine receiving from the user the value for each digit in the first sequence;

step (c) comprises:

(c1) the first ATM machine transmitting each digit value to the centralized banking subsystem;

(c2) the centralized banking subsystem comparing each digit value with the value of the corresponding digit in the user's PIN code to determine whether or not the user is validated;

the method further comprises:

(d) the system enabling the user to perform further system-implemented functions during the first access event if the system determines that the user is validated in step (c); and (e) the system preventing the user from performing the further system-implemented functions during the first access event if the system determines that the user is not validated in step (c);

the method further comprises, during a second access event different from the first access event:

(f) the second ATM machine presenting to the user a second sequence of one or more representations of the user's PIN code, wherein the second sequence is characterized by at least one of:

(i) the characters identified by the second sequence correspond to a second subset of the characters in the code different from the first subset; and (ii) the second sequence identifies the characters in a second order different from the first order;

(g) the second ATM machine receiving from the user a value for each digit in the second sequence;

(h) the second ATM machine transmitting each digit value in the second sequence to the centralized server;

(i) the centralized banking subsystem comparing each digit value in the second sequence with the value of the corresponding digit in the user's PIN code to determine whether or not the user is validated;

(j) the centralized banking subsystem enabling the user to perform further system-implemented functions during the second access event if the centralized banking subsystem determines that the user is validated in step (i); and (k) the centralized banking subsystem preventing the user from performing the further system-implemented functions during the second access event if the centralized banking subsystem determines that the user is not validated in step (i);

the first ATM machine is not provided with values for all of the digits in the user's PIN code during the first access event; and the second ATM machine is not provided with values for all of the digits in the user's PIN code during the second access event.

12. A system for validating a user having a code comprising a plurality of characters, characterized by, during a first access event:

(a) the system presenting to the user a first sequence of one or more representations of the user's code, wherein:

each representation identifies one or more characters to be provided by the user; and the first sequence is characterized by at least one of:

(i) the characters identified by the first sequence correspond to a first subset of the characters in the code; and (ii) the first sequence identifies the characters in a first order different from the order in which the characters appear in the code;

(b) the system receiving from the user a value for each identified character in the first sequence; and (c) the system comparing the value for each character in the first sequence received from the user with a value of a corresponding character in the user's code to determine whether or not the user is validated.

13. The system of claim 12, wherein:

the system is a distributed system comprising a centralized server and at least a first remote terminal configured to communicate with the centralized server; and during the first access event, the system is characterized by:

the first remote terminal presenting to the user the first sequence of one or more representations of the user's code;

the first remote terminal receiving from the user the value for each identified character in the first sequence;

the first remote terminal transmitting each character value to the centralized server; and the centralized server comparing each character value with the value of the corresponding character in the user's code to determine whether or not the user is validated; and the first remote terminal is not provided with values for all of the characters in the user's code during the first access event.

14. The system of claim 12, wherein:

the system is a distributed ATM system comprising a centralized banking subsystem and at least first and second remote ATM machines configured to communicate with the centralized banking subsystem via a communication network;

the user's code is a PIN code comprising a plurality of digits;

during the first access event, the system is characterized by:

the first ATM machine presenting to the user the first sequence of one or more representations of the user's PIN code;

the first ATM machine receiving from the user the value for each digit in the first sequence;

the first ATM machine transmitting each digit value to the centralized banking subsystem;

the centralized banking subsystem comparing each digit value with the value of the corresponding digit in the user's PIN code to determine whether or not the user is validated;

the system enabling the user to perform further system-implemented functions during the first access event if the system determines that the user is validated; and the system preventing the user from performing the further system-implemented functions during the first access event if the system determines that the user is not validated;

during a second access event different from the first access event, the system is characterized by:

the second ATM machine presenting to the user a second sequence of one or more representations of the user's PIN code, wherein the second sequence is characterized by at least one of:

(i) the characters identified by the second sequence correspond to a second subset of the characters in the code different from the first subset; and (ii) the second sequence identifies the characters in a second order different from the first order;

second ATM machine receiving from the user a value for each digit in the second sequence;

the second ATM machine transmitting each digit value in the second sequence to the centralized server;

the centralized banking subsystem comparing each digit value in the second sequence with the value of the corresponding digit in the user's PIN code to determine whether or not the user is validated;

the centralized banking subsystem enabling the user to perform further system-implemented functions during the second access event if the centralized banking subsystem determines that the user is validated; and the centralized banking subsystem preventing the user from performing the further system-implemented functions during the second access event if the centralized banking subsystem determines that the user is not validated;

the first ATM machine is not provided with values for all of the digits in the user's PIN code during the first access event; and the second ATM machine is not provided with values for all of the digits in the user's PIN code during the second access event.

15. Apparatus for a distributed system for validating a user having a code comprising a plurality of characters, wherein:

the distributed system comprises a centralized server and at least a first remote terminal configured to communicate with the centralized server;

the first remote terminal is configured to:

(a) present, during a first access event, to the user a first sequence of one or more representations of the user's code, wherein the second sequence is characterized by at least one of:

(i) the characters identified by the second sequence correspond to a second subset of the characters in the code different from the first subset; and (ii) the second sequence identifies the characters in a second order different from the first order;

(b) receive, during the first access event, from the user a value for each digit in the first sequence; and (c) transmit, during the first access event, each digit value to the centralized server;

the centralized server is configured to compare, during the first access event, the value for each character in the first sequence received from the user with a value of a corresponding character in the user's code to determine whether or not the user is validated;

the first remote terminal is not provided with values for all of the characters in the user's code during the first access event; and the apparatus is one of the centralized server and the first remote terminal.

16. The apparatus of claim 15, wherein the characters identified by the first sequence correspond to the first subset of the characters in the code.

17. The apparatus of claim 15, wherein the first sequence identifies the characters in the first order different from the order in which the characters appear in the code.

18. The apparatus of claim 17, wherein the characters identified by the first sequence correspond to the first subset of the characters in the code.

19. The apparatus of claim 15, wherein the apparatus is the centralized server.

20. The apparatus of claim 15, wherein the apparatus is the first remote terminal.

21. The apparatus of claim 15, wherein:

the distributed system is a distributed ATM system comprising a centralized banking subsystem and at least first and second remote ATM machines configured to communicate with the centralized banking subsystem via a communication network;

the user's code is a PIN code comprising a plurality of digits;

the first remote ATM machine is configured to present to the user the first representation of the user's PIN code during a first access event;

the first remote ATM machine is configured to receive from the user the value for each digit in the first sequence during the first access event;

the first remote ATM machine is configured to transmit each digit value to the banking subsystem during the first access event;

the centralized banking subsystem is configured to compare each digit value with the value of the corresponding digit in the user's PIN code to determine whether or not the user is validated during the first access event;

the centralized banking subsystem is configured to enable the user to perform further system-implemented functions during the first access event if the system determines that the user is validated;

the centralized banking subsystem is configured to prevent the user from performing the further system-implemented functions during the first access event if the system determines that the user is validated;

the second remote ATM machine is configured to present, during a second access event different from the first access event, to the user a second sequence of one or more representations of the user's PIN code, wherein the second sequence is characterized by at least one of:

(i) the characters identified by the second sequence correspond to a second subset of the characters in the code different from the first subset; and (ii) the second sequence identifies the characters in a second order different from the first order;

the second remote ATM machine is configured to receive, during the second access event, from the user a value for each digit in the second sequence;

the second ATM machine is configured to transmit, during the second access event, each digit value in the second sequence to the centralized server;

the centralized banking subsystem is configured to compare, during the second access event, each digit value in the second sequence with the value of the corresponding digit in the user's PIN code to determine whether or not the user is validated;

the centralized banking subsystem is configured to enable, during the second access event, the user to perform further banking functions during the second access event if the centralized banking subsystem determines that the user is validated;

the centralized banking subsystem is configured to prevent, during the second access event, the user from performing the further banking functions during the second access event if the centralized banking subsystem determines that the user is not validated;

the first ATM machine is not provided with values for all of the digits in the user's PIN code during the first access event; and the second ATM machine is not provided with values for all of the digits in the user's PIN code during the second access event.

* * * * *